US011305391B2

(12) United States Patent
Chen et al.

(10) Patent No.: US 11,305,391 B2
(45) Date of Patent: Apr. 19, 2022

(54) ZERO POSITIONING MECHANISM OF THE METALWORKING MACHINE

(71) Applicant: YUE DAR INDUSTRY CO., LTD, Taichung (TW)

(72) Inventors: Po-Shen Chen, Taichung (TW); Ju-Tan Chen, Taichung (TW)

(73) Assignee: YUE DAR INDUSTRY CO., LTD., Taichung (TW)

( * ) Notice: Subject to any disclaimer, the term of this patent is extended or adjusted under 35 U.S.C. 154(b) by 127 days.

(21) Appl. No.: 16/902,391

(22) Filed: Jun. 16, 2020

(65) Prior Publication Data
US 2021/0379714 A1    Dec. 9, 2021

(30) Foreign Application Priority Data
Jun. 5, 2020   (TW) .................................. 109119253

(51) Int. Cl.
*B23Q 3/18* (2006.01)
*B23Q 3/08* (2006.01)

(52) U.S. Cl.
CPC .............. *B23Q 3/18* (2013.01); *B23Q 3/082* (2013.01)

(58) Field of Classification Search
CPC ........ B23Q 3/082; B23Q 3/102; B23Q 3/103; B23Q 3/106; B23Q 3/107; B23Q 3/108; B23B 31/16233; B23B 31/16237; B23B 31/4046; B23B 31/4033; B23B 31/404; B23B 31/4066; Y10T 279/1973
USPC ........................... 29/464; 279/2.1, 2.11, 2.18
See application file for complete search history.

(56) References Cited

U.S. PATENT DOCUMENTS

2020/0070291 A1* 3/2020 Chou .................. B23Q 1/0072

* cited by examiner

*Primary Examiner* — Monica S Carter
*Assistant Examiner* — Alberto Saenz
(74) *Attorney, Agent, or Firm* — Karin L. Williams; Alan D. Kamrath; Mayer & Williams PC

(57) ABSTRACT

A zero-positioning mechanism of a metalworking machine contains: a base, a locking jig, and a pneumatic cylinder. The base includes at least one installation area. The locking jig includes a body, a slider assembly, and a fixing plate. The pneumatic cylinder includes the piston and a push unit. The body includes a through orifice, the slider assembly includes two pushers and four sliders. A respective pusher has a lower fringe, two beveled fringes, and multiple receiving orifices. A respective receiving orifice is configured to accommodate a respective one of multiple resilient elements. A respective slider is arranged on the respective beveled fringe of the respective pusher and has a conical positioning portion. The fixing plate includes a first face and a second face. The first face has multiple coupling apertures and four locking apertures, and the second face has a groove with multiple chutes.

6 Claims, 13 Drawing Sheets

A-A Cross-sectional

ZERO POSITIONING MECHANISM OF THE METALWORKING MACHINE

FIELD OF THE INVENTION

The present invention relates to a locking equipment of a metalworking machine, and more particularly to a zero positioning mechanism of the metalworking machine.

BACKGROUND OF THE INVENTION

In automatic machining process, it is troublesome to fix a workpiece easily and securely. For example, when fixing or removing the workpiece manually, the workpiece cannot be locked with even exert force. When the workpiece is locked with insufficient exert force, the workpiece removes from the fixture or the jig. When locking the workpiece with excessive exert force, the workpiece is deformed. To overcome above-mentioned problems, the fixture or the jig is driven pneumatically or hydraulically via a medium.

To machine the workpiece accurately, at least one movable positioning unit is arranged on the jig so as to fix the workpiece on the jig, thus machining the workpiece. However, before machining the workpiece, the at least one movable positioning unit has to be removed. When the at least one movable positioning unit is not removed before machining the workpiece, it interferes the machining process.

In addition, it is time-consuming to align the jig with the at least one movable positioning unit, thus increasing fabrication cost.

Thus, a zero positioning jig is designed based on a design concept of an indexing table, wherein the indexing table includes at least four driven push posts and a drive post. In operation, the drive post rotates to actuate the four driven push posts to clamp the workpiece. Nevertheless, the drive post actuates the four driven posts unevenly, so the workpiece are clamped by the four driven push posts roughly, thus causing abrasion to the four driven posts unevenly and inaccurate machining position.

The present invention has arisen to mitigate and/or obviate the afore-described disadvantages.

SUMMARY OF THE INVENTION

The primary aspect of the present invention is to provide a zero-positioning mechanism of a metalworking machine which enhance a clamping accuracy and actuates the push unit of the pneumatic cylinder actuates the slider assembly to movably clamp the workpiece to avoid a machining interface by fixing the slider assembly below the fixing plate.

Secondary aspect of the present invention is to provide a zero-positioning mechanism of a metalworking machine which pushes the respective pusher by ways of the push unit so that the respective slider slides stably.

Further aspect of the present invention is to provide a zero-positioning mechanism of a metalworking machine which contains the pneumatic cylinder configured to actuate the piston to move linearly by ways of hydraulic oils or compressed airs.

Another aspect of the present invention is to provide a zero-positioning mechanism of a metalworking machine by which a pushing direction of the respective pusher is located at 45 degrees between the two sliders so that the respective slider is pushed by the respective pusher to move to degrees evenly and easily.

To obtain above-mentioned aspects, a zero-positioning mechanism of a metalworking machine provided by the present invention contains: a base, a locking jig, and a pneumatic cylinder.

The base includes at least one installation area configured to fix the locking jig.

The locking jig is configured to clamp a workpiece, and the locking jig including a body, a slider assembly, and a fixing plate.

The pneumatic cylinder actuates a piston to move linearly by ways of hydraulic oils or compressed airs, the pneumatic cylinder is mounted below the body, and the pneumatic cylinder includes the piston rotatably connected on a center thereof and actuated by the hydraulic oils or compressed airs so as to move linearly, a push unit fixed on a top of the piston.

The body is fixed on the at least one installation area of the base, and the body includes a through orifice defined on a center thereof and corresponding to the push unit.

The slider assembly is mounted on the body and is actuated by the push unit, the slider assembly includes two pushers and four sliders, the two pushers are symmetrically arranged besides the through orifice, a respective pusher has a lower fringe, two beveled fringes, and multiple receiving orifices defined on a respective beveled fringe, wherein a respective receiving orifice is configured to accommodate a respective one of multiple resilient elements, and the respective resilient element is configured to connect the two pushers, when the two pushers are pushed by the push unit, the multiple resilient elements push the two pushers back to an original position.

A respective slider is arranged on the respective beveled fringe of the respective pusher and has a conical positioning portion with respect to the respective beveled fringe.

The fixing plate is disposed on a top of the body and covers the slider assembly to limit a movement of the slider assembly.

The fixing plate includes a first face and a second face, the first face has multiple coupling apertures and four locking apertures which pass through the fixing plate, and the fixing plate is locked on the top of the body by multiple locking bolts; the second face has a groove defined thereon and configured to receive the slider assembly, wherein the groove has multiple chutes diagonally thereon so that the respective slider slides in a respective chute, and a bottom of the respective chute is connected with a respective locking aperture, wherein the conical positioning portion of the respective slider extends into or does not contact with the respective locking aperture, and the respective locking aperture is configured to receive a workpiece.

When the zero-positioning mechanism does not operate, the respective pusher of the slider assembly is pulled by the respective resilient element to urge the conical positioning portion of the respective slider to retract into the respective chute, hence the conical positioning portion does not contact the workpiece.

Preferably, the pneumatic cylinder further includes two symmetrically tilted guide faces formed on a top of the push unit, an arcuate face defined between and connected with the two symmetrically tilted guide faces.

Preferably, the first face of the fixing plate has a locating notch.

Preferably, the fixing plate further a removal device, an accommodation hole, and a post received in the accommodation hole and configured to push any one pusher back to an original position.

DETAILED DESCRIPTION OF THE PREFERRED EMBODIMENTS

Figure 1:
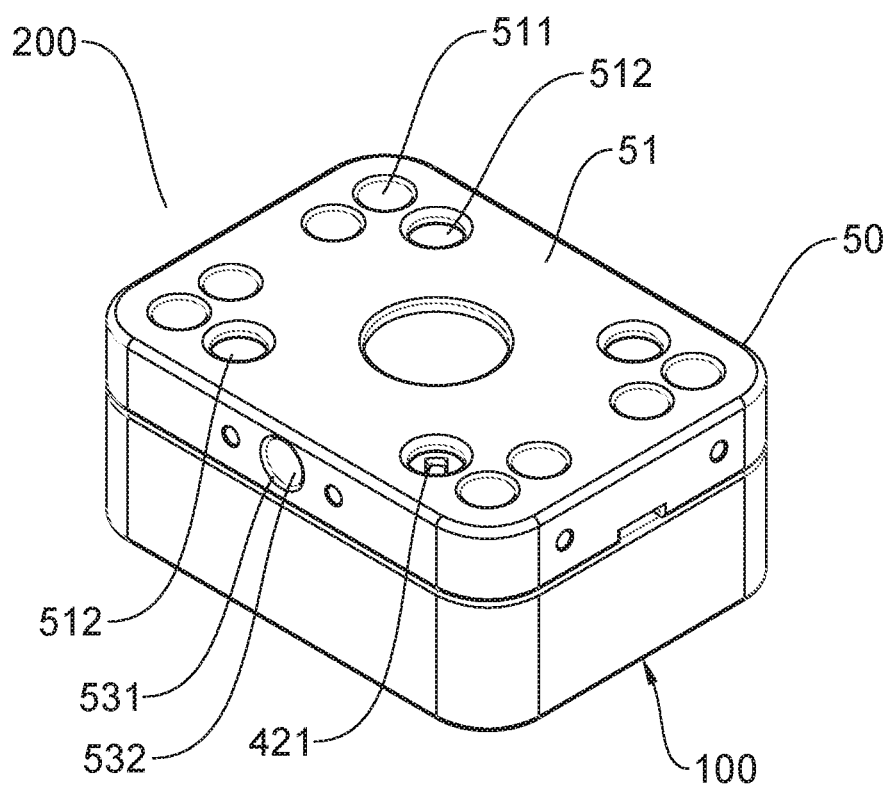
FIG. 1 is a perspective view showing the assembly of a zero-positioning mechanism of a metalworking machine according to a preferred embodiment of the present invention.
Figure 2:
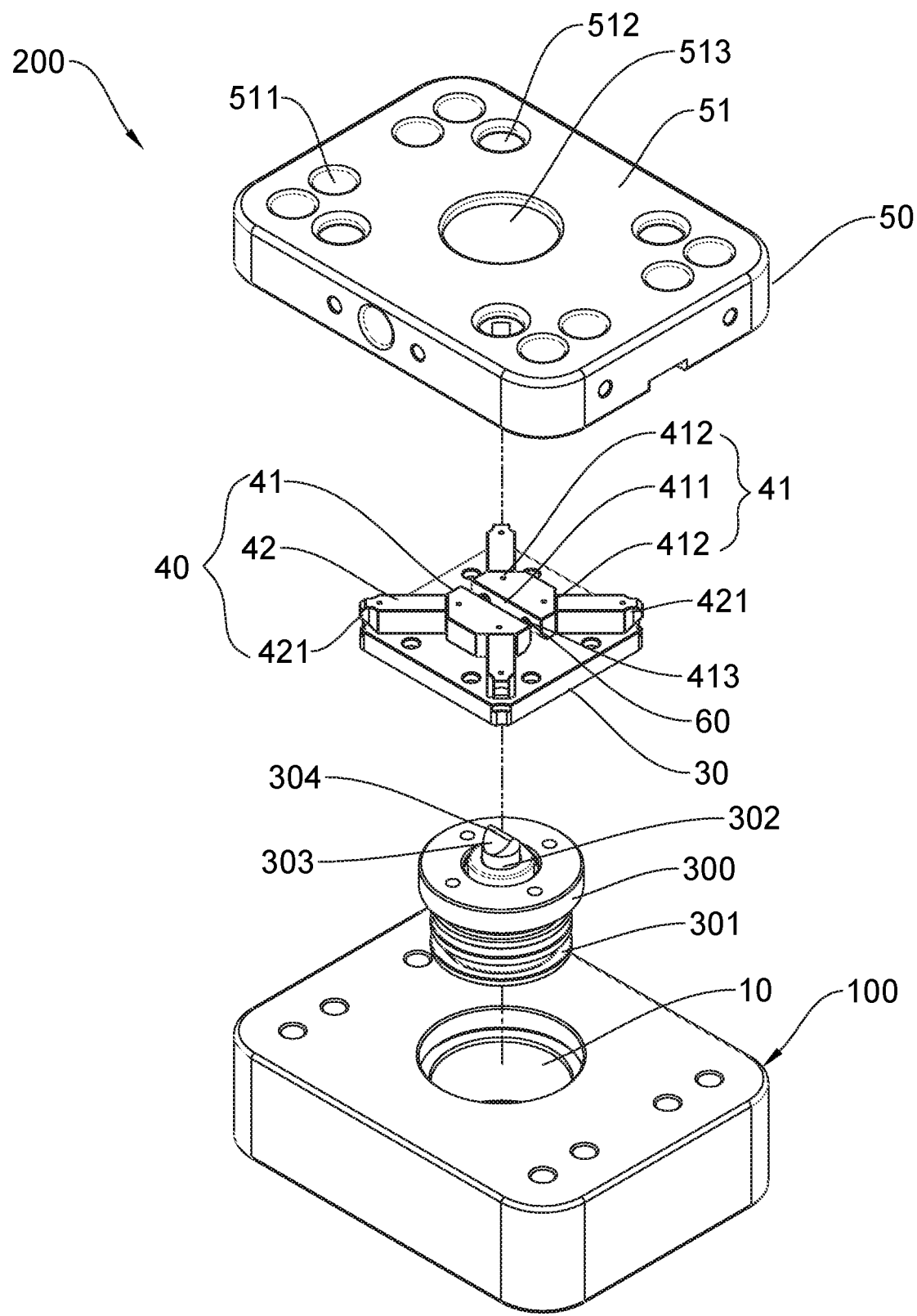
FIG. 2 is a perspective view showing the exploded components of the zero-positioning mechanism of the metalworking machine according to the preferred embodiment of the present invention.

With reference to FIGS. 1 and 2, a zero-positioning mechanism of a metalworking machine according to a preferred embodiment of the present invention comprises: a base 100, a locking jig 200, and a pneumatic cylinder 300.

Figure 3:
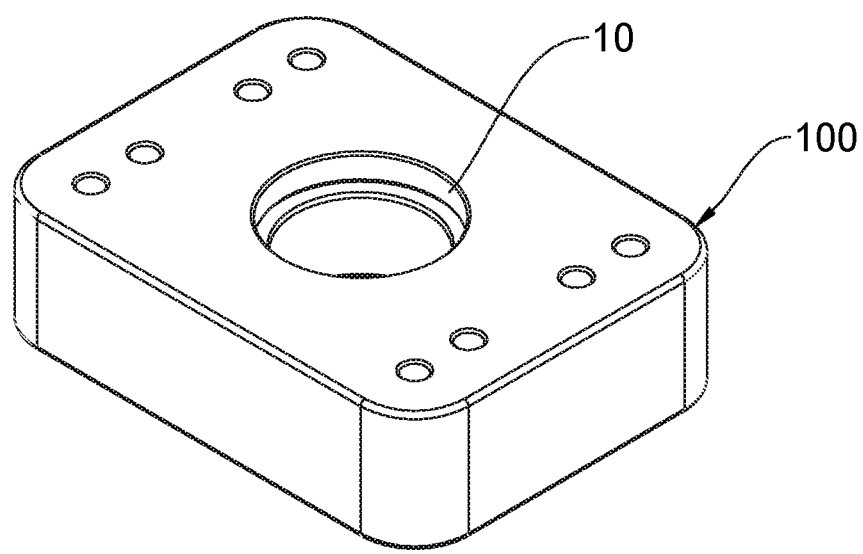
FIG. 3 is a perspective view showing the assembly of a part of the zero-positioning mechanism of the metalworking machine according to the preferred embodiment of the present invention.
Figure 4:
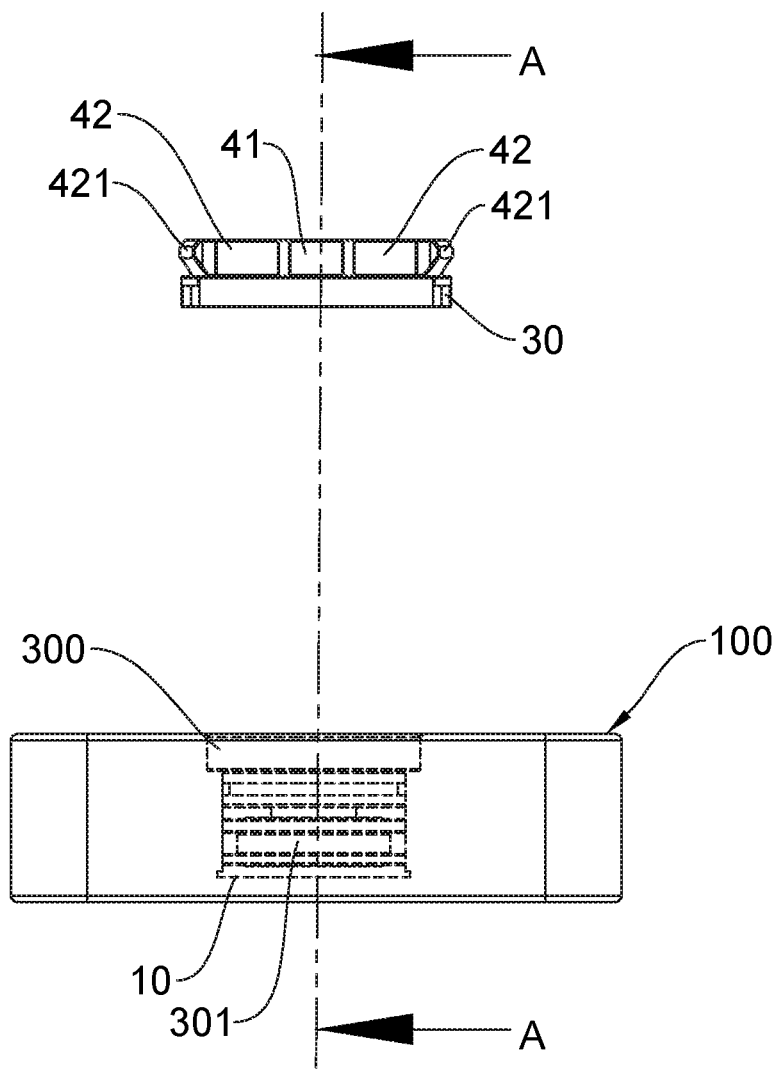
FIG. 4 is a cross sectional view showing the exploded components of a part of the zero-positioning mechanism of the metalworking machine according to the preferred embodiment of the present invention.
Figure 5:
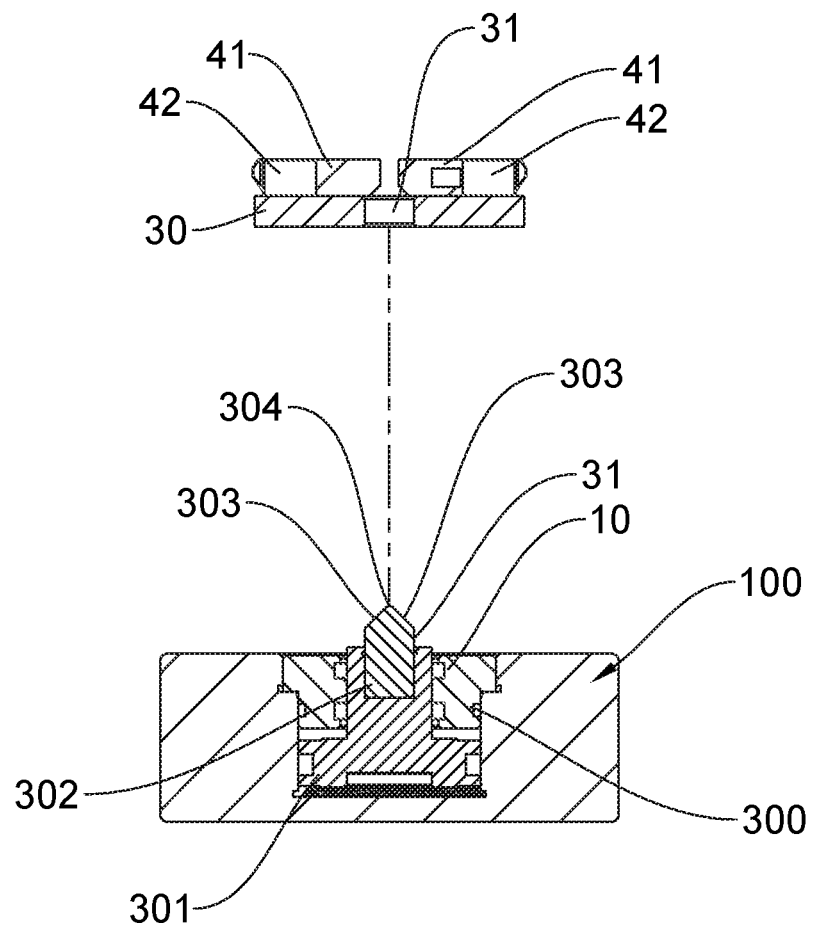
FIG. 5 is a cross sectional view taken along the line A-A of FIG. 4.
Figure 6:
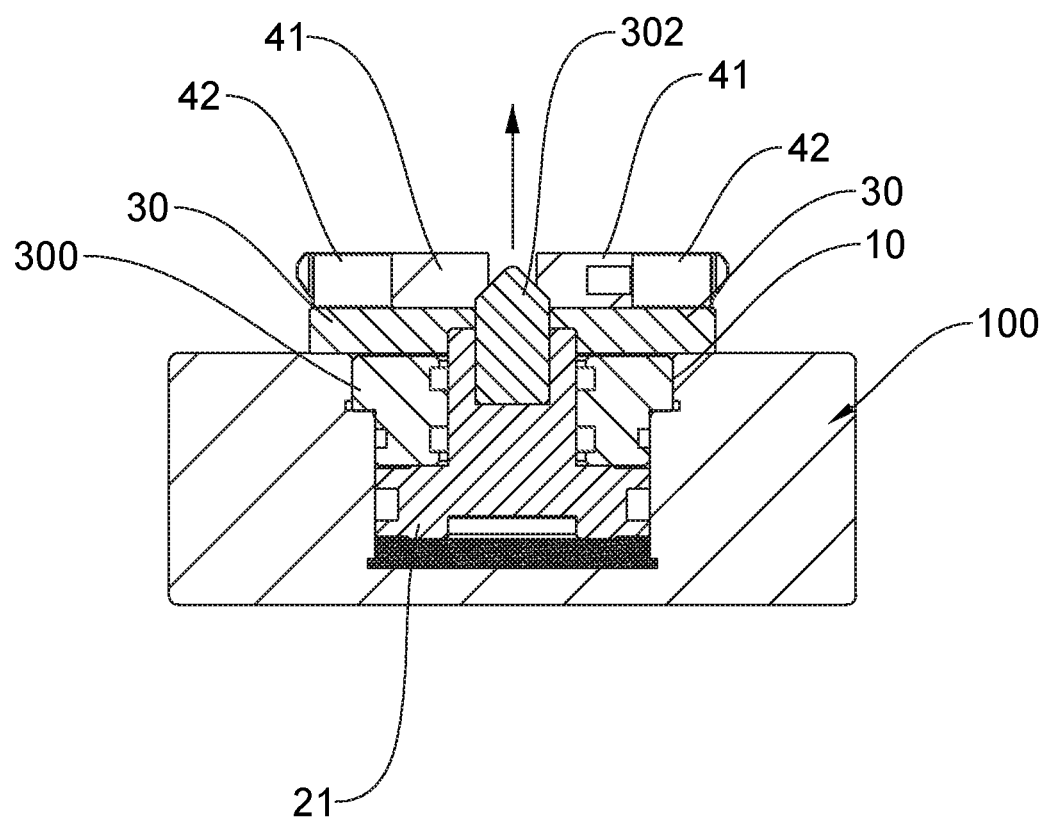
FIG. 6 is a cross sectional view showing the assembly of the zero-positioning mechanism of the metalworking machine according to the preferred embodiment of the present invention.
Figure 7:
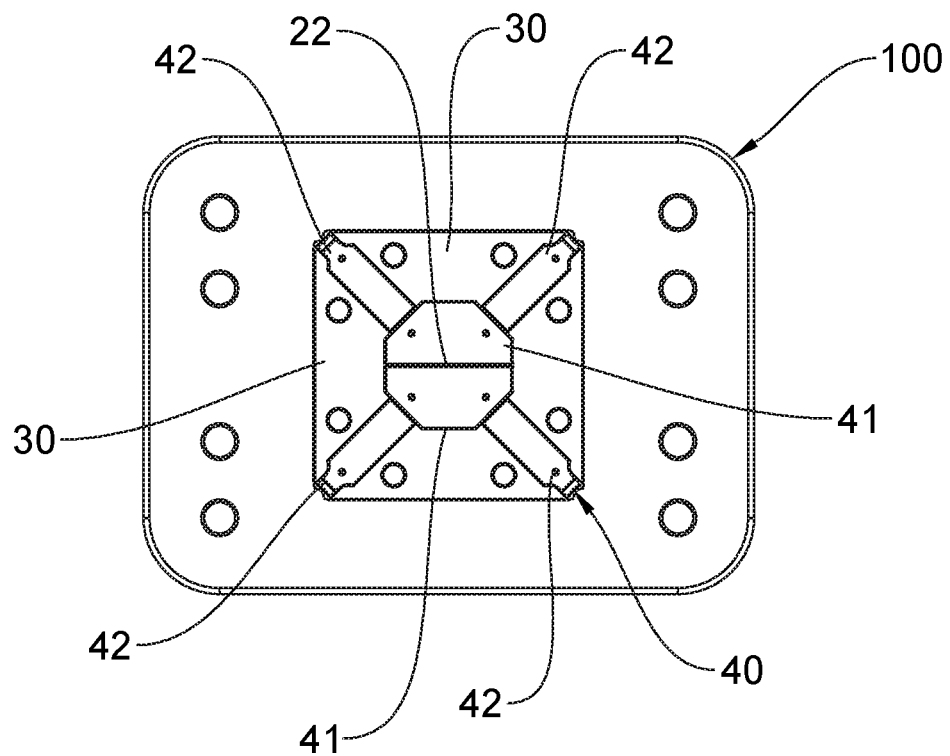
FIG. 7 is a side plan view showing the operation of the zero-positioning mechanism of the metalworking machine according to the preferred embodiment of the present invention.
Figure 8:
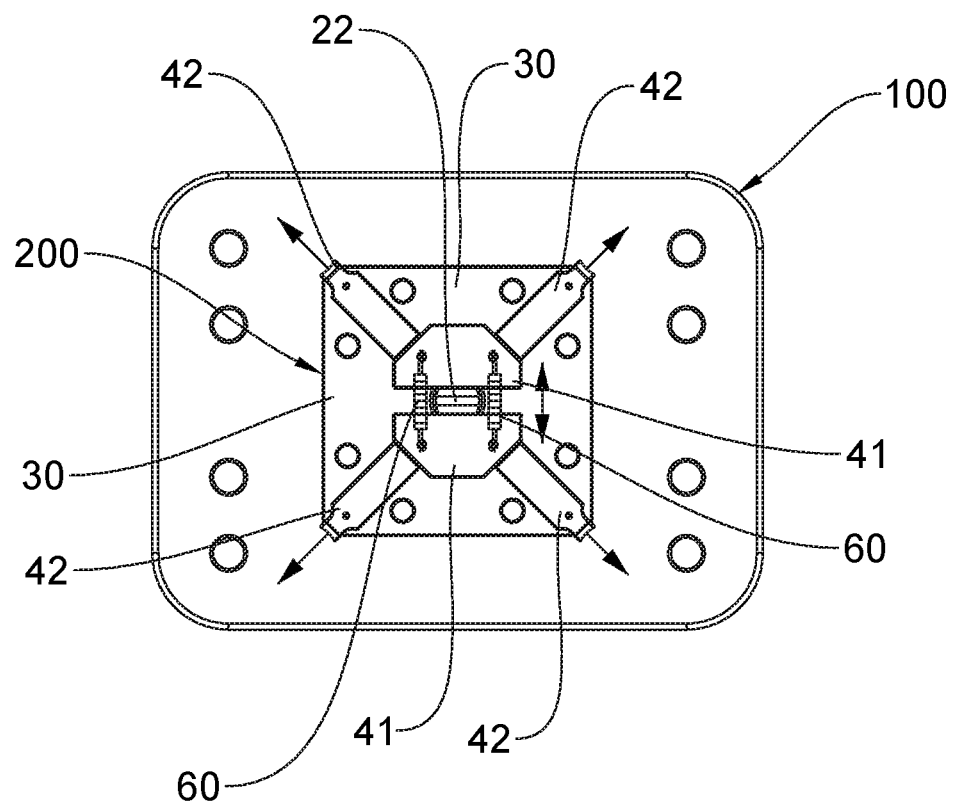
FIG. 8 is another side plan view showing the operation of the zero-positioning mechanism of the metalworking machine according to the preferred embodiment of the present invention.
Figure 9:
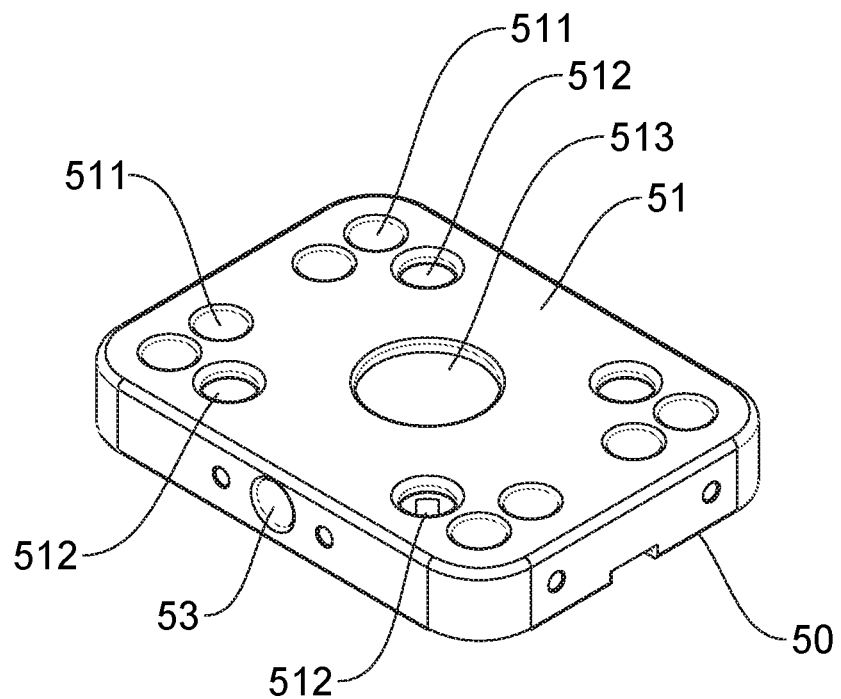
FIG. 9 is a perspective view showing the assembly of a part of the zero-positioning mechanism of the metalworking machine according to the preferred embodiment of the present invention.
Figure 10:
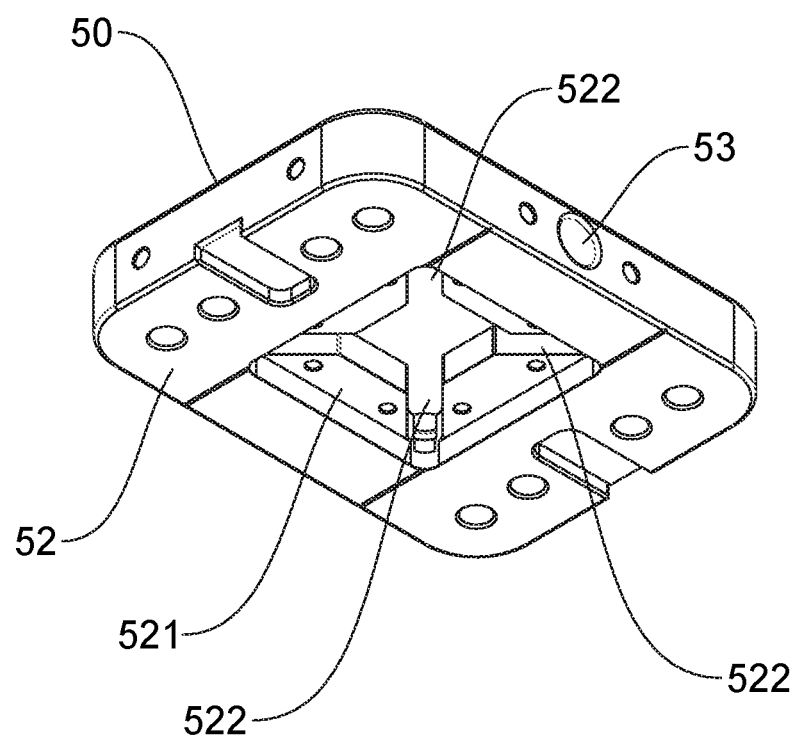
FIG. 10 is another perspective view showing the assembly of a part of the zero-positioning mechanism of the metalworking machine according to the preferred embodiment of the present invention.

Referring to FIGS. 2 and 3, the base 100 includes at least one installation area 10 configured to fix the locking jig 200.

As shown in FIGS. 1 and 2, the locking jig 200 is configured to clamp a workpiece W, and the locking jig 200 includes a body 30, a slider assembly 40, and a fixing plate 50.

As illustrated in FIGS. 2 and 4-8, the pneumatic cylinder 300 actuates a piston 301 to move linearly by ways of hydraulic oils or compressed airs, wherein the pneumatic cylinder 300 is mounted below the body 30, and the pneumatic cylinder 300 includes the piston 301 rotatably connected on a center thereof and actuated by the hydraulic oils or the compressed airs so as to move linearly, a push unit 302 fixed on a top of the piston 301, two symmetrically tilted guide faces 303 formed on a top of the push unit 302, an arcuate face 304 defined between and connected with the two symmetrically tilted guide faces 303.

With reference to FIGS. 2 and 4-8, the body 30 is fixed on the at least one installation area 10 of the base 100, and the body 30 includes a through orifice 31 defined on a center thereof and corresponding to the push unit 302.

Referring to FIGS. 2 and 4-8, the slider assembly 40 is mounted on the body 30 and is actuated by the push unit 302. The slider assembly 40 includes two pushers 41 and four sliders 42, the two pushers 41 are symmetrically arranged besides the through orifice 31, a respective pusher 41 has a lower fringe 411, two beveled fringes 412, and multiple receiving orifices 413 defined on a respective beveled fringe 412, wherein a respective receiving orifice 413 is configured to accommodate a respective one of multiple resilient elements 60, and the respective resilient element 60 is configured to connect the two pushers 41. When the two pushers 41 are pushed by the push unit 302, the multiple resilient elements 60 push the two pushers 41 back to an original position. A respective slider 42 is arranged on the respective beveled fringe 412 of the respective pusher 41 and has a conical positioning portion 421 with respect to the respective beveled fringe 412, wherein a pushing direction of the respective pusher 41 is located at 45 degrees between the two sliders 42 so that the respective slider 42 is pushed by the respective pusher 41 to move to 45 degrees evenly and easily.

As shown FIGS. 1-2 and 9-10, the fixing plate 50 is disposed on a top of the body 30 and covers the slider assembly 40 to limit a movement of the slider assembly 40.

The fixing plate 50 includes a first face 51 and a second face 52, wherein the first face 51 has multiple coupling apertures 511 and four locking apertures 512 which pass through the fixing plate 50, and the fixing plate 50 is locked on the top of the body 30 by multiple locking bolts. The second face 52 has a groove 521 defined thereon and configured to receive the slider assembly 40, wherein the groove 521 has multiple chutes 521 diagonally thereon so that the respective slider 42 slides in a respective chute 521, and a bottom of the respective chute 522 is connected with a respective locking aperture 512, wherein the conical positioning portion 421 of the respective slider 42 extends into or does not contact with the respective locking aperture 512, and the respective locking aperture 512 is configured to receive the workpiece W. Preferably, the first face 51 of the fixing plate 50 has a locating notch 513.

Figure 11:
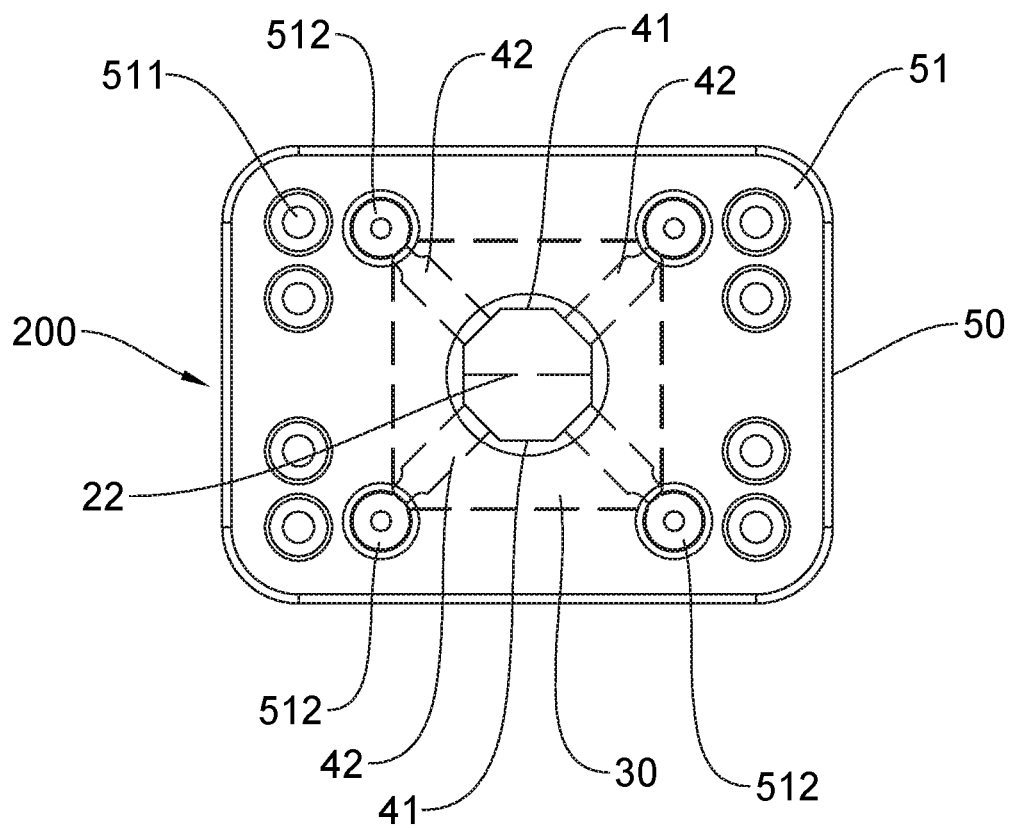
FIG. 11 is another side plan view showing the operation of the zero-positioning mechanism of the metalworking machine according to the preferred embodiment of the present invention.
Figure 12:
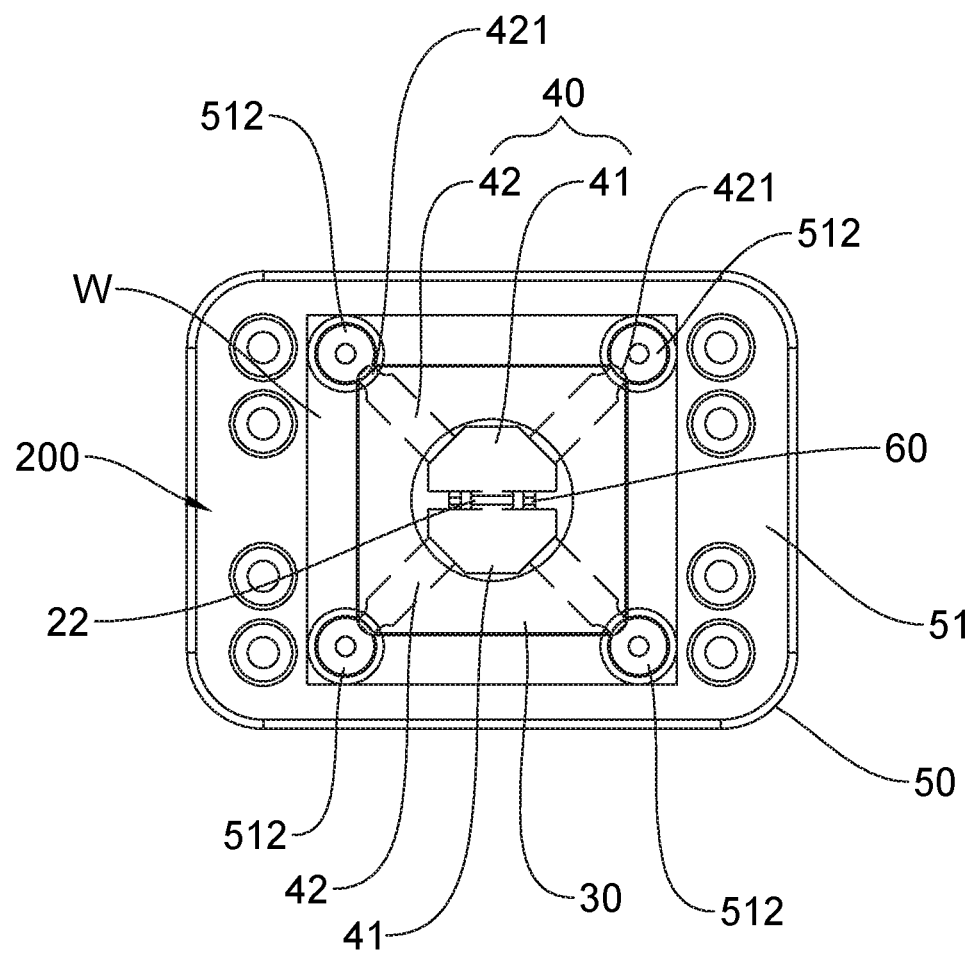
FIG. 12 is also another side plan view showing the operation of the zero-positioning mechanism of the metalworking machine according to the preferred embodiment of the present invention.

As illustrated in FIG. 11, when the zero-positioning mechanism does not operate, the respective pusher 41 of the slider assembly 40 is pulled by the respective resilient element 60 to urge the conical positioning portion 421 of the respective slider 42 to retract into the respective chute 522, hence the conical positioning portion 421 does not contact the workpiece W.

With reference to FIGS. 6-8 and 12, in operation, the piston 301 of the pneumatic cylinder 300 is pushed by the hydraulic oils to move upward. The push unit 302 extends out of the through orifice 31 of the body 30 to urge the respective pusher 41 to push the respective slider 42, such that the conical positioning portion 421 of the respective slider 42 extends out of the respective locking aperture 512 along the respective chute 522 to clamp the workpiece W.

Figure 13:
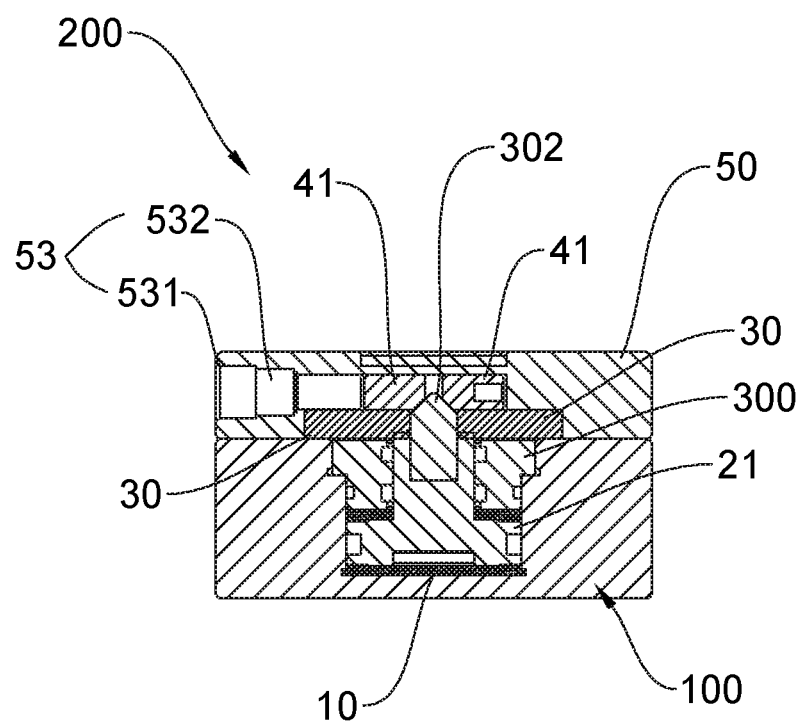
FIG. 13 is a cross sectional view showing the operation of the zero-positioning mechanism of the metalworking machine according to the preferred embodiment of the present invention.

Referring to FIG. 13, the fixing plate 50 further a removal device 53, an accommodation hole 531, and a post 532 received in the accommodation hole 531 and configured to push any one pusher 41 back to an original position.

The zero-positioning mechanism is in connection with a controller (not shown), and the controller is configured to actuate the piston 301 of the pneumatic cylinder 300 to move, hence the slider assembly 40 is driven by the piston 301 to clamp the workpiece W.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention

What is claimed is:

1. A zero-positioning mechanism of a metalworking machine comprising: a base, a locking jig, and a pneumatic cylinder;

the base including at least one installation area configured to fix the locking jig;

the locking jig being configured to clamp a workpiece, and the locking jig including a body, a slider assembly, and a fixing plate;

wherein the pneumatic cylinder actuates a piston to move linearly by ways of hydraulic oils or compressed airs, the pneumatic cylinder is mounted below the body, and the pneumatic cylinder includes the piston rotatably connected on a center thereof and actuated by the hydraulic oils or compressed airs so as to move linearly, a push unit fixed on a top of the piston;

wherein the body is fixed on the at least one installation area of the base, and the body includes a through orifice defined on a center thereof and corresponding to the push unit;

wherein the slider assembly is mounted on the body and is actuated by the push unit, the slider assembly includes two pushers and four sliders, the two pushers are symmetrically arranged besides the through orifice, a respective pusher has a lower fringe, two beveled fringes, and multiple receiving orifices defined on a respective beveled fringe, wherein a respective receiving orifice is configured to accommodate a respective one of multiple resilient elements, and the respective resilient element is configured to connect the two pushers, when the two pushers are pushed by the push unit, the multiple resilient elements push the two pushers back to an original position;

wherein a respective slider is arranged on the respective beveled fringe of the respective pusher and has a conical positioning portion with respect to the respective beveled fringe;

wherein the fixing plate is disposed on a top of the body and covers the slider assembly to limit a movement of the slider assembly;

wherein the fixing plate includes a first face and a second face, the first face has multiple coupling apertures and four locking apertures which pass through the fixing plate, and the fixing plate is locked on the top of the body by multiple locking bolts; the second face has a groove defined thereon and configured to receive the slider assembly, wherein the groove has multiple chutes diagonally thereon so that the respective slider slides in a respective chute, and a bottom of the respective chute is connected with a respective locking aperture, wherein the conical positioning portion of the respective slider extends into or does not contact with the respective locking aperture, and the respective locking aperture is configured to receive the workpiece;

wherein when the zero-positioning mechanism does not operate, the respective pusher of the slider assembly is pulled by the respective resilient element to urge the conical positioning portion of the respective slider to retract into the respective chute, hence the conical positioning portion does not contact the workpiece;

wherein in operation, the piston of the pneumatic cylinder is pushed by the hydraulic oils to move upward; the push unit extends out of the through orifice of the body to urge the respective pusher to push the respective slider, such that the conical positioning portion of the respective slider extends out of the respective locking aperture along the respective chute to clamp the workpiece.

2. The zero-positioning mechanism as claimed in claim 1, wherein the pneumatic cylinder further includes two symmetrically tilted guide faces formed on a top of the push unit, an arcuate face defined between and connected with the two symmetrically tilted guide faces.

3. The zero-positioning mechanism as claimed in claim 1, wherein the first face of the fixing plate has a locating notch.

4. The zero-positioning mechanism as claimed in claim 1, wherein the fixing plate further a removal device, an accommodation hole, and a post received in the accommodation hole and configured to push any one pusher back to an original position.

5. The zero-positioning mechanism as claimed in claim 1, wherein the zero-positioning mechanism is in connection with a controller, and the controller is configured to actuate the piston of the pneumatic cylinder to move, hence the slider assembly is driven by the piston to clamp the workpiece.

6. The zero-positioning mechanism as claimed in claim 1, wherein a pushing direction of the respective pusher is located at 45 degrees between the two sliders so that the respective slider is pushed by the respective pusher to move to 45 degrees evenly and easily.

* * * * *